United States Patent
Tekaligne et al.

(10) Patent No.: US 12,249,691 B2
(45) Date of Patent: Mar. 11, 2025

(54) ELECTROLYTE-SOLUTION COMPOSITION AND SECONDARY BATTERY USING SAME

(71) Applicant: Advanced Lithium Electrochemistry Co., Ltd., Taoyuan (TW)

(72) Inventors: Teshager Mekonnen Tekaligne, Taoyuan (TW); Siao-Chun Liao, Taoyuan (TW); Wei-Nien Su, Taoyuan (TW); Bing-Joe Hwang, Taoyuan (TW)

(73) Assignee: Advanced Lithium Electrochemistry Co., Ltd., Taoyuan (TW)

( * ) Notice: Subject to any disclaimer, the term of this patent is extended or adjusted under 35 U.S.C. 154(b) by 466 days.

(21) Appl. No.: 17/724,809

(22) Filed: Apr. 20, 2022

(65) Prior Publication Data

US 2022/0367912 A1     Nov. 17, 2022

Related U.S. Application Data

(60) Provisional application No. 63/181,658, filed on Apr. 29, 2021.

(51) Int. Cl.
*H01M 10/0567* (2010.01)
*H01M 10/0568* (2010.01)

(52) U.S. Cl.
CPC .... *H01M 10/0567* (2013.01); *H01M 10/0568* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 2013/0078529 A1* | 3/2013 | Yang | H01M 10/0567 429/207 |
| 2019/0280335 A1 | 9/2019 | Kataoka | |

FOREIGN PATENT DOCUMENTS

| | | |
|---|---|---|
| CN | 102340029 A | 2/2012 |
| CN | 108091489 A | 5/2018 |
| CN | 112635822 A | 4/2021 |
| JP | 2009117081 A | 5/2009 |
| JP | 2012089468 A | 5/2012 |
| JP | 2016213101 A | 12/2016 |
| TW | 202109960 A | 3/2021 |
| WO | 2011052605 A1 | 5/2011 |

* cited by examiner

*Primary Examiner* — Lisa S Park
(74) *Attorney, Agent, or Firm* — KIRTON McCONKIE; Evan R. Witt (57) ABSTRACT

An electrolyte-solution composition and a secondary battery using the same. The electrolyte-solution composition is configured in contact with an aluminous surface of a cathode. The electrolyte-solution composition includes an electrolyte solution and a hydroxyquinoline compound. With the hydroxyquinoline compound included in the electrolyte-solution composition, oxidation and corrosion occurred on the aluminous surface, which are caused by the electrolyte-solution composition, is reduced. Accordingly, the capacity of the secondary battery is improved, and the occurrence of self-discharge phenomenon is avoided.

12 Claims, 13 Drawing Sheets

ELECTROLYTE-SOLUTION COMPOSITION AND SECONDARY BATTERY USING SAME

CROSS-REFERENCE TO RELATED APPLICATION

This application claims the benefit of U.S. Provisional Application No. 63/181,658 filed on Apr. 29, 2021, and entitled "ADDITIVE FOR INHIBITING ALUMINUM CORROSION AND METHODS OF MAKING THEREOF". The entireties of the above-mentioned patent application are incorporated herein by reference for all purposes.

FIELD OF THE INVENTION

The present disclosure relates to an electrolyte-solution composition and a secondary battery using the same, and more particularly to an electrolyte-solution composition having a hydroxyquinoline compound and a secondary battery using the same for improving an electrical performance thereof.

BACKGROUND OF THE INVENTION

With rapid technological development nowadays, performance of consumer electronics and electric vehicles is constantly improving, and demands for energy are growing accordingly. Therefore, secondary battery becomes one of the mainstream energy storage devices with its portable and rechargeable characteristics. Among different types of the secondary batteries, the lithium-ion secondary battery is the one having the most development potential.

Aluminum not only has advantages of high electrical conductivity, low density and low cost, but also can form a natural oxide layer ($Al_2O_3$) helpful for resisting corrosion on the surface. Therefore, aluminum foil is the most common choice as the cathode current collector in the lithium-ion secondary battery. However, in a lithium ion electrolyte solution, lithium salts such as lithium bis(trifluoromethanesulfonyl)imide (LiTFSI), lithium hexafluorophosphate ($LiPF_6$) or lithium perchlorate ($LiClO_4$) still oxidize and corrode the aluminum foil. Accordingly, the dissolution of the aluminum ions occurs, and the battery performance degrades.

Therefore, there is a need to provide an electrolyte-solution composition having a hydroxyquinoline compound and a secondary battery using the same for improving an electrical performance thereof.

SUMMARY OF THE INVENTION

An object of the present disclosure is to provide an electrolyte-solution composition having a hydroxyquinoline compound and a secondary battery using the same for improving an electrical performance thereof. By using a hydroxyquinoline compound as an additive in an electrolyte-solution composition, an aluminum foil, which is used as a cathode of a secondary battery, is not easily oxidized and corroded by the electrolyte-solution composition in contact therewith. Accordingly, the capacity of the secondary battery is improved, and the occurrence of self-discharge phenomenon is avoided. The hydroxyquinoline compound further has a weight percent concentration ranged from 0.1 wt % to 2.5 wt % in the electrolyte-solution composition, so as to obtain the electrolyte-solution composition with appropriate viscosity. With the appropriate viscosity, the reduction of ionic conductivity of the electrolyte-solution composition is avoided, and the battery performance is further improved.

In accordance with an aspect of the present disclosure, an electrolyte-solution composition is provided. The electrolyte-solution composition is configured in contact with an aluminous surface of a cathode. The electrolyte-solution composition includes an electrolyte solution and a hydroxyquinoline compound.

In an embodiment, the electrolyte solution includes a lithium salt.

In an embodiment, the lithium salt includes one selected from the group consisting of a lithium bis(trifluoromethanesulfonyl)imide (LiTFSI), a lithium bis(fluorosulfonyl)imide (LiFSI), a lithium hexafluorophosphate ($LiPF_6$), a lithium perchlorate ($LiClO_4$), a lithium metaborate ($LiBO_4$) and a combination thereof.

In an embodiment, the hydroxyquinoline compound includes one selected from the group consisting of an 8-Hydroxyquinoline, a 5-formyl-8-hydroxyquinoline and a combination thereof.

In an embodiment, the hydroxyquinoline compound has a weight percent concentration ranged from 0.1 wt % to 2.5 wt % in the electrolyte-solution composition.

In an embodiment, the hydroxyquinoline compound has a viscosity ranged from 1 mPa·s to 6 mPa·s.

In an embodiment, the cathode further includes a current collector, and the aluminous surface is disposed on the current collector.

In accordance with another aspect of the present disclosure, a secondary battery is provided. The secondary battery includes a cathode and an electrolyte-solution composition. The cathode includes an aluminous surface. The electrolyte-solution composition is configured in contact with the aluminous surface. The electrolyte-solution composition includes an electrolyte solution and a hydroxyquinoline compound.

In an embodiment, the electrolyte solution includes a lithium salt.

In an embodiment, the lithium salt includes one selected from the group consisting of a lithium bis(trifluoromethanesulfonyl)imide (LiTFSI), a lithium bis(fluorosulfonyl)imide (LiFSI), a lithium hexafluorophosphate ($LiPF_6$), a lithium perchlorate ($LiClO_4$), a lithium metaborate ($LiBO_4$) and a combination thereof.

In an embodiment, the hydroxyquinoline compound includes one selected from the group consisting of an 8-Hydroxyquinoline, a 5-formyl-8-hydroxyquinoline and a combination thereof.

In an embodiment, the hydroxyquinoline compound has a weight percent concentration ranged from 0.1 wt % to 2.5 wt % in the electrolyte-solution composition.

In an embodiment, the hydroxyquinoline compound has a viscosity ranged from 1 mPa·s to 6 mPa·s.

In an embodiment, the cathode further includes a current collector, and the aluminous surface is disposed on the current collector.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. Alternatively, the word "about" means within an acceptable standard error of ordinary skill in the art-recognized average. In addition to the operation/working examples, or unless otherwise specifically stated otherwise, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

Figure 1:
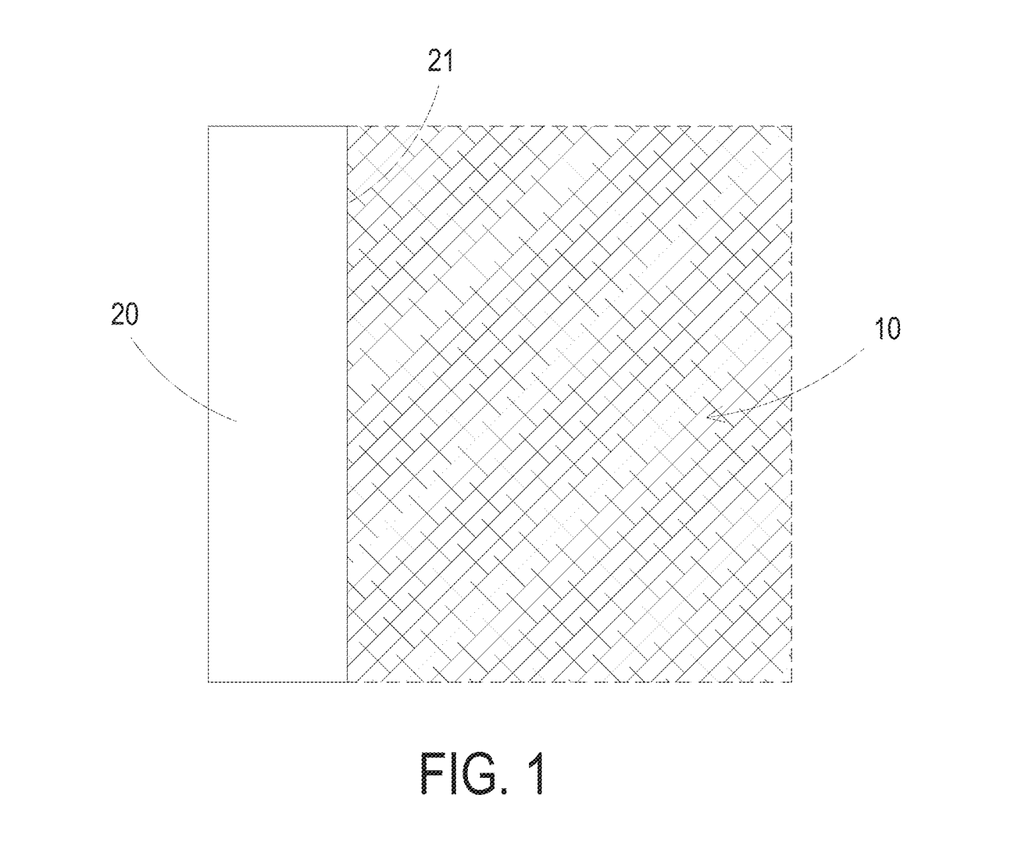
FIG. 1 is a schematic view illustrating a secondary battery using an electrolyte-solution composition of an embodiment of the present disclosure.

In an embodiment, an electrolyte-solution composition 10 is configured in contact with an aluminous surface 21 of a cathode 20. The electrolyte-solution composition 10 includes an electrolyte solution and a hydroxyquinoline compound.

In the embodiment, the electrolyte solution includes a lithium salt such as a lithium bis(trifluoromethanesulfonyl)imide (LiTFSI). In other embodiments, the lithium salt is one selected from the group consisting of a lithium bis(fluorosulfonyl)imide (LiFSI), a lithium hexafluorophosphate ($LiPF_6$), a lithium perchlorate ($LiClO_4$) and a lithium metaborate ($LiBO_4$).

In an embodiment, the hydroxyquinoline compound is an 8-Hydroxyquinoline. The molecular structure of the 8-hydroxyquinoline is shown below.

In another embodiment, the hydroxyquinoline compound is a 5-formyl-8-hydroxyquinoline. The molecular structure of the 5-formyl-8-hydroxyquinoline is shown below.

In other embodiments, the hydroxyquinoline compound is one selected from the group consisting of an 8-hydroxyquinoline, a 5-formyl-8-hydroxyquinoline and a combination thereof. The type of the hydroxyquinoline compound is adjusted according to the practical requirement. The present disclosure is not limited thereto.

In the embodiment, the hydroxyquinoline compound has a weight percent concentration ranged from 0.1 wt % to 2.5 wt % in the electrolyte-solution composition 10. The hydroxyquinoline compound has a viscosity ranged from 1 mPa·s to 6 mPa·s. Preferably but not exclusively, the cathode 20 further includes a current collector, and the aluminous surface 21 is disposed on the current collector. Table 1 below shows the viscosities of the electrolyte compositions 10 including the hydroxyquinoline compounds with different concentrations. In table 1, the electrolyte solution of the electrolyte-solution compositions 10 includes a LiTFSI and a Zn(OTf)$_2$. The LiTFSI has a concentration of 21 mol/kgw, and the Zn(OTf)$_2$ has a concentration of 2 mol/kgw. As shown in table 1, when the hydroxyquinoline compound has a weight percent concentration up to 3 wt % in the electrolyte-solution composition 10, the viscosity of the electrolyte-solution composition 10 is greater than 6 mPa·s. Accordingly, the ionic conductivity of the electrolyte-solution composition 10 is reduced, and the reduction is even greater at low temperature. Therefore, the electrolyte-solution composition 10 with the appropriate viscosity is obtained by controlling the concentration of the hydroxyquinoline compound. Thereby, the reduction of the ionic conductivity of the electrolyte-solution composition is avoided, and the battery performance is further improved.

TABLE 1

| Electrolyte-solution composition | Viscosity (mPa · s) |
| --- | --- |
| Electrolyte solution + 1 wt % 8-Hydroxyquinoline | 3.485 |
| Electrolyte solution + 1 wt % 5-formyl-8-Hydroxyquinoline | 3.985 |
| Electrolyte solution + 3 wt % 8-Hydroxyquinoline | 6.151 |
| Electrolyte solution + 3 wt % 5-formyl-8-Hydroxyquinoline | 6.251 |

Refer to FIG. 1. FIG. 1 is a schematic view illustrating a secondary battery using an electrolyte-solution composition of an embodiment of the present disclosure. In the embodiment, the secondary battery 1 includes a cathode 20 and the electrolyte-solution composition 10. Preferably but not exclusively, the cathode 20 includes an aluminous surface 21. The electrolyte-solution composition 10 is configured in contact with the aluminous surface 21. The electrolyte-solution composition 10 includes an electrolyte solution and a hydroxyquinoline compound. In other embodiment, the secondary battery 1 further includes a cathode material coated on the cathode 20. The present disclosure is not limited thereto.

In the embodiment, the electrolyte solution includes a lithium salt. In other embodiments, the lithium salt is one selected from the group consisting of a lithium bis(fluorosulfonyl)imide (LiFSI), a lithium hexafluorophosphate (LiPF$_6$), a lithium perchlorate (LiCLO$_4$) and a lithium metaborate (LiBO$_4$).

In an embodiment, the hydroxyquinoline compound is an 8-Hydroxyquinoline.

In another embodiment, the hydroxyquinoline compound is a 5-formyl-8-hydroxyquinoline.

In other embodiments, the hydroxyquinoline compound is one selected from the group consisting of an 8-hydroxyquinoline, a 5-formyl-8-hydroxyquinoline and a combination thereof. The type of the hydroxyquinoline compound is adjusted according to the practical requirements. The present disclosure is not limited thereto.

In the embodiment, the hydroxyquinoline compound has a weight percent concentration ranged from 0.1 wt % to 2.5 wt % in the electrolyte-solution composition 10. The hydroxyquinoline compound has a viscosity ranged from 1 mPa·s to 6 mPa·s. Preferably but not exclusively, the cathode 20 further includes a current collector, and the aluminous surface 21 is disposed on the current collector. By controlling the concentration of the hydroxyquinoline compound, the electrolyte-solution composition 10 with the appropriate viscosity is obtained. Thereby, the reduction of the ionic conductivity of the electrolyte-solution composition is avoided, and the battery performance is further improved.

The test results of the following examples illustrate the efficacy of the electrolyte-solution composition of the present disclosure.

Comparative Example

The comparative example is an electrolyte-solution composition without hydroxyquinoline compound. The electrolyte-solution composition includes a lithium bis(trifluoromethanesulfonyl)imide (LiTFSI).

Figure 2A:
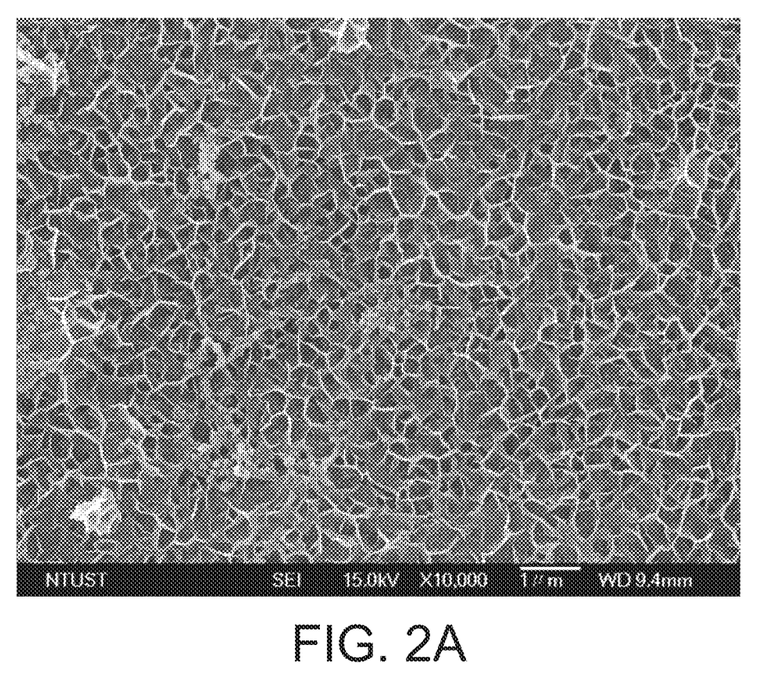
FIGS. 2A to 2B are SEM images illustrating surface morphology of an aluminum foil subjected to an one-week immersion test and a two-week immersion test, respectively, with an electrolyte-solution composition of a comparative example.
Figure 2B:
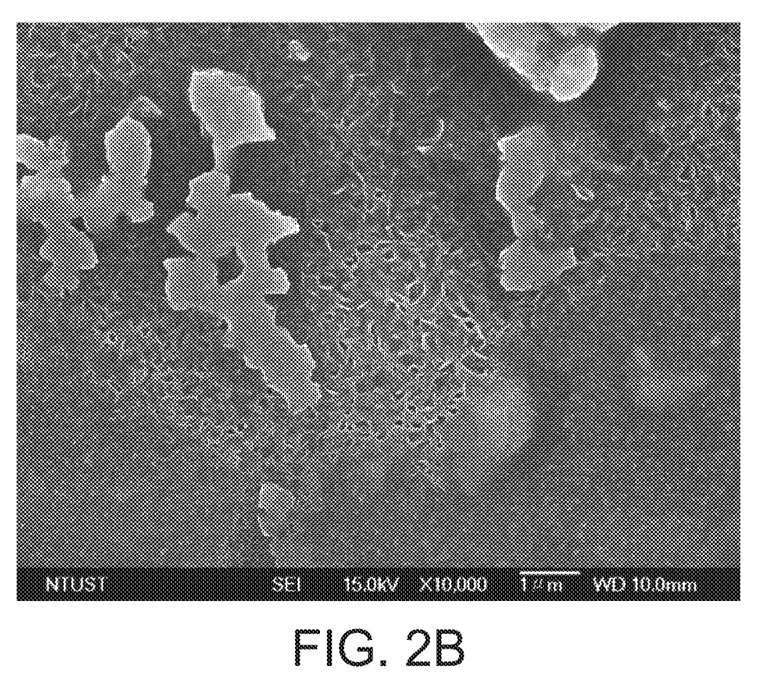

Refer to FIG. 2A to 2B. FIGS. 2A to 2B are SEM images illustrating surface morphology of an aluminum foil subjected to an one-week immersion test and a two-week immersion test, respectively, with the electrolyte-solution composition of the comparative example. The electrolyte-solution composition only includes a LiTFSI. The LiTFSI has a concentration of 1 mol/kgw. As shown in FIG. 2A, the aluminum foil surface is significantly corroded after the one-week immersion test. As shown in FIG. 2B, the aluminum foil surface is totally corroded after the two-week immersion test.

Figure 3:
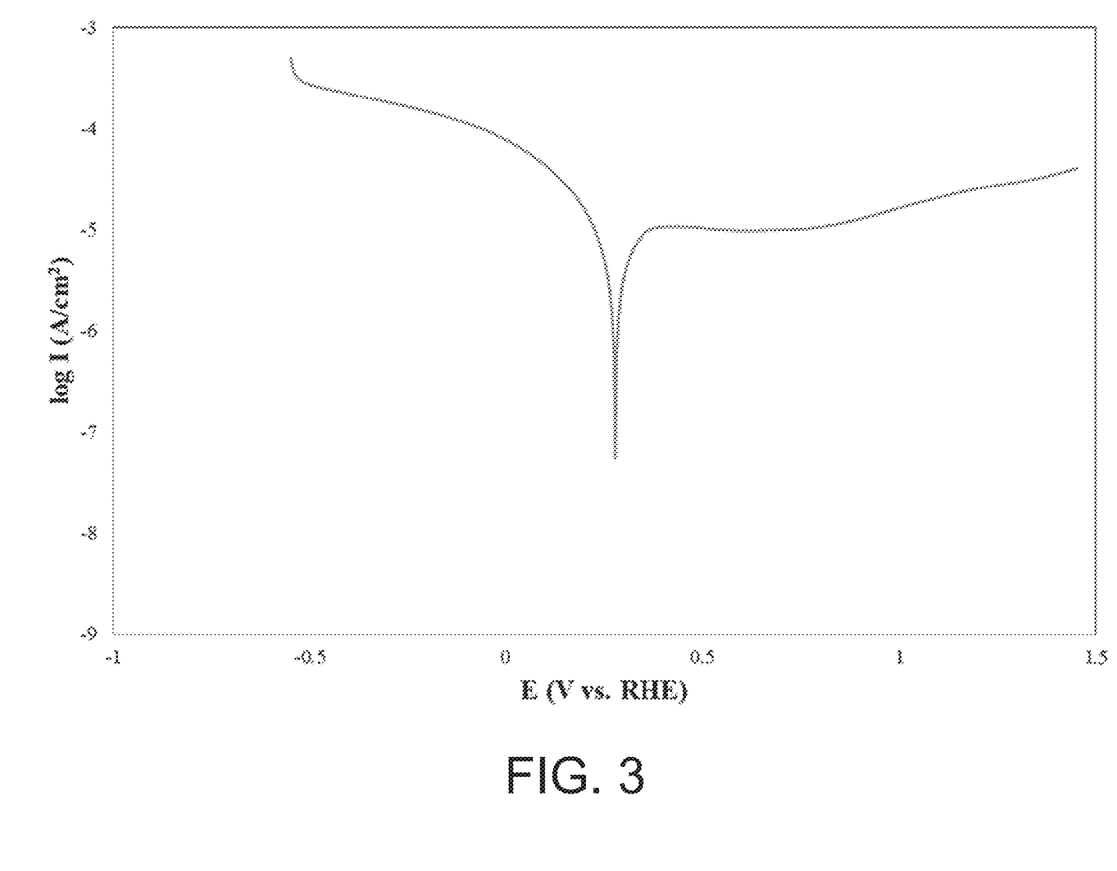
FIG. 3 is a potentiodynamic polarization curve of the electrolyte-solution composition of the comparative example.

Refer to FIG. 3. FIG. 3 is a potentiodynamic polarization curve of the electrolyte-solution composition of the comparative example. The electrolyte-solution composition only includes a LiTFSI. The LiTFSI has a concentration of 1 mol/kgw. The potentiodynamic polarization curve is obtained with a three-electrode system. The three-electrode system includes an aluminum foil as a working electrode, a graphite as a counter electrode, and a reversible hydrogen electrode (RHE) as a reference electrode. In the test, the potential is firstly scanned in the cathodic direction from the corrosion potential ($E_{corr}$), and then scanned in the anodic direction from the corrosion potential. Before the test, the electrodes are immersed in the electrolyte-solution composition for a few seconds to ensure a consistent corrosion potential.

Fitting results of the potentiodynamic polarization curve in FIG. 3 are shown as follows. The corrosion potential is 262.89 mV. The corrosion current ($I_{corr}$) is 9.60 μA. The corrosion rate (CR) of the working electrode is 0.1116 millimeters per year (mmpy). The aluminum foil is further subjected to an Energy dispersive X-ray spectrometer (EDS) analysis after the potentiodynamic polarization test. Results of the EDS analysis show that the aluminum content on the surface of the aluminum foil is 79.08 wt %. In other words, after the potentiodynamic polarization test, about 79 wt % aluminum is remained on the surface of the aluminum foil.

Figure 4A:
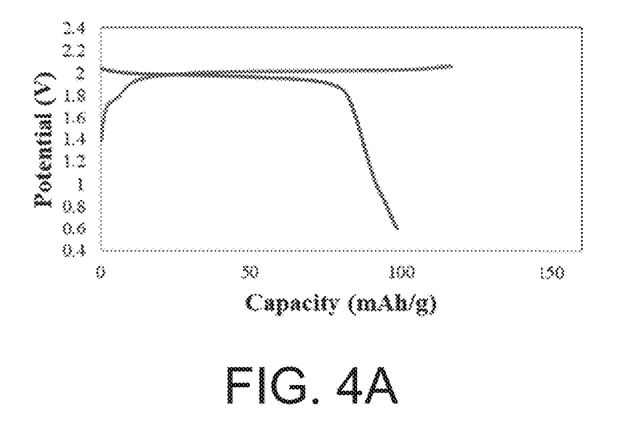
FIGS. 4A to 4C are charging/discharging curves of a secondary battery using the electrolyte-solution composition of the comparative example at different cycles.
Figure 4B:
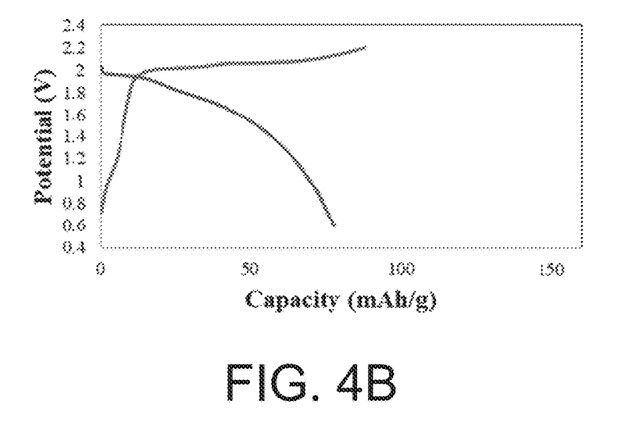
Figure 4C:
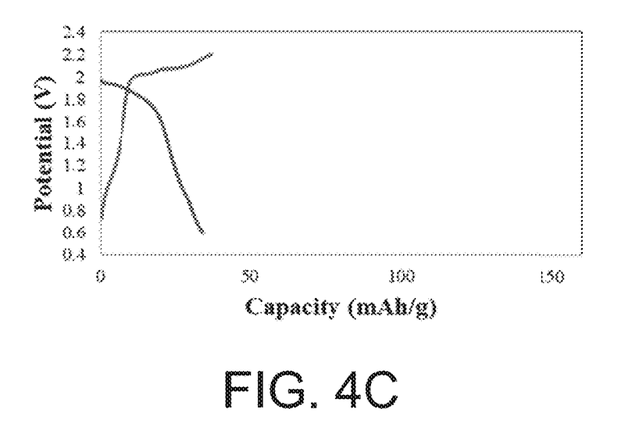

Refer to FIGS. 4A to 4C. FIGS. 4A to 4C are charging/discharging curves of a secondary battery using an electrolyte-solution composition of the comparative example at the first cycle, the fifth cycle and the fifteenth cycle. The electrolyte-solution composition only includes a LiTFSI and a Zn(OTf)$_2$. The LiTFSI has a concentration of 21 mol/kgw, and the Zn(OTf)$_2$ has a concentration of 2 mol/kgw. Preferably but not exclusively, the secondary battery is a CR2032 type coin cell. The secondary battery includes an aluminum foil coated with lithium vanadium fluorophosphates (LiVPO$_4$F, LVPF) as a cathode, a zinc foil as an anode, and a glass fiber as a separator. The charging/discharging experiment is carried out under the room temperature (25° C.) with a 40-channel battery analyzer. The charging/discharging rate (C-rate) is 2 C, and the potential window while charging/discharging is from 0.6 V to 2.2 V. Table 2 below shows the charging/discharging capacity of the secondary battery at the first cycle, the fifth cycle and the fifteenth cycle. Table 2 also shows the capacity retention rate at the fifteenth cycle.

TABLE 2

|  | First cycle | Fifth cycle | Fifteenth cycle | Capacity retention rate at fifteenth cycle |
|---|---|---|---|---|
| Charging capacity (mAh/g) | 116.98 | 88.10 | 36.77 | 31.4% |
| Discharging capacity (mAh/g) | 98.84 | 78.16 | 33.00 | 34.4% |

Figure 5:
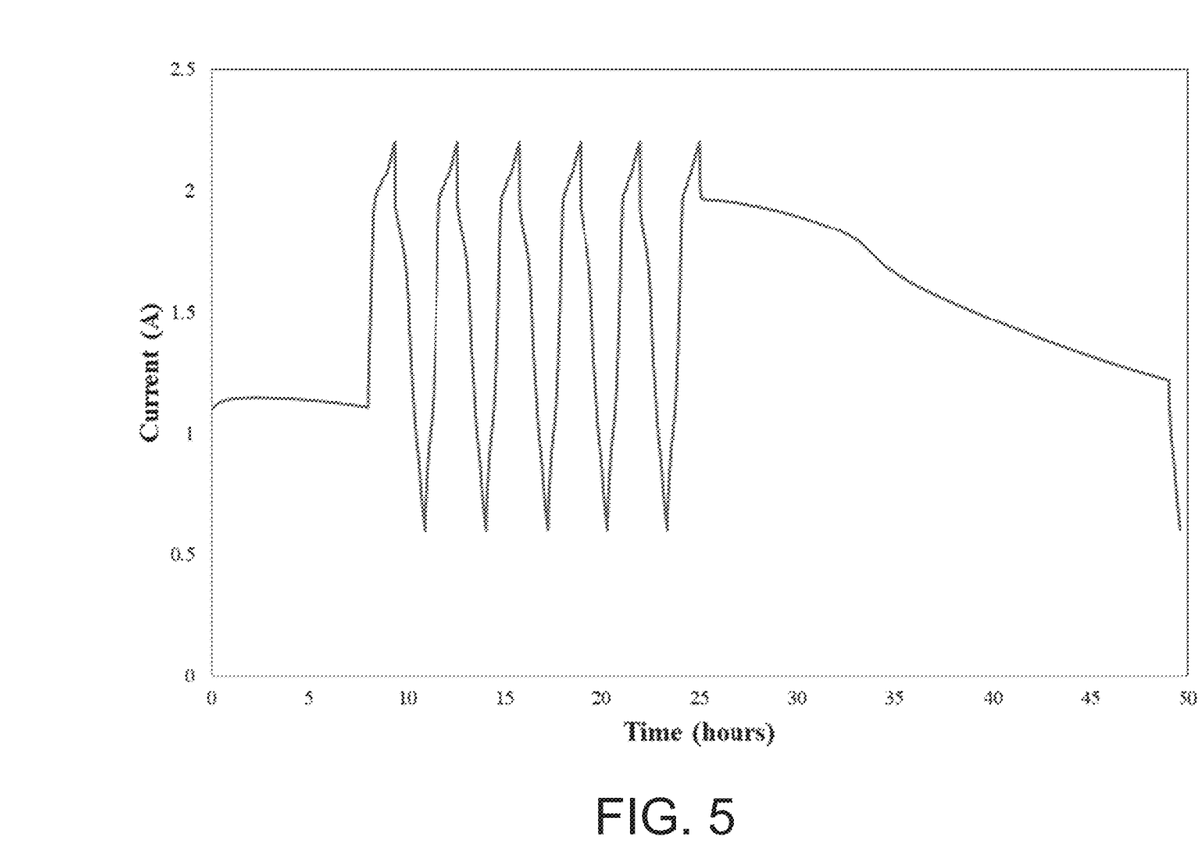
FIG. 5 is a battery characteristic curve illustrating another secondary battery using the electrolyte-solution composition of the comparative example.

Refer to FIG. 5. FIG. 5 is a battery characteristic curve illustrating another secondary battery using the electrolyte-solution composition of the comparative example. The secondary battery is charged and discharged for 5 cycles and left to sit for 24 hours. The electrolyte-solution composition only includes a LiTFSI and a Zn(OTf)$_2$. The LiTFSI has a concentration of 21 mol/kgw, and the Zn(OTf)$_2$ has a concentration of 2 mol/kgw. Preferably but not exclusively, the secondary battery is a CR2032 type coin cell. The secondary battery includes an aluminum foil coated with lithium vanadium fluorophosphates (LiVPO$_4$F, LVPF) as a cathode, a zinc foil as an anode, and a glass fiber as a separator. The charging/discharging experiment is carried out under the room temperature (25° C.) with a 40-channel battery analyzer. The charging/discharging rate (C-rate) is 0.2 C, and the potential window while charging/discharging is from 0.6 V to 2.2 V. As shown in FIG. 5, the secondary battery completes the fifth cycle at the twenty-fifth hour, and is left to sit for 24 hours to the forty-eighth hour. However, the current of the secondary battery shows a significant downward trend when it starts to sit, and the downward trend continues to the forty-eighth hour. It is clear that the secondary battery using the electrolyte-solution composition of the comparative example has significant self-discharge phenomenon.

First Demonstrative Example

Figure 6A:
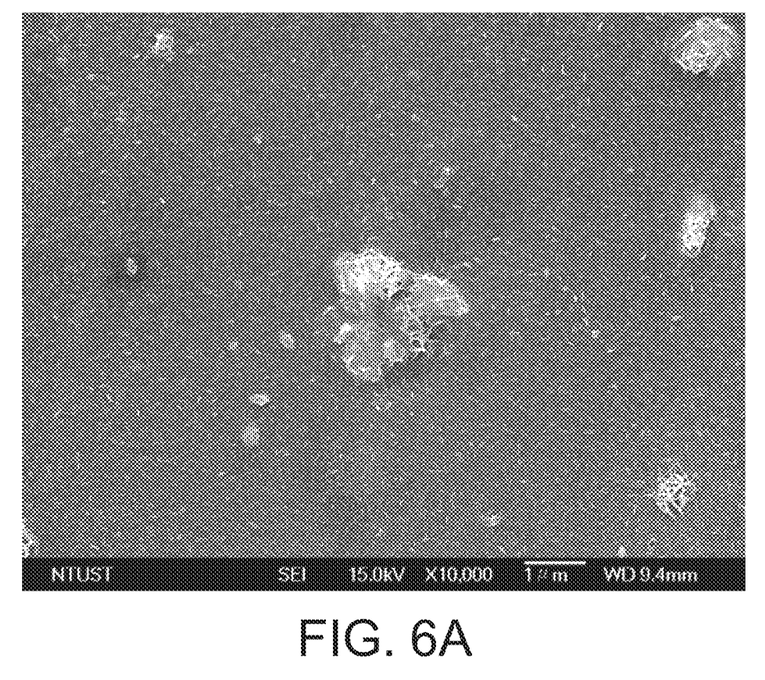
FIGS. 6A to 6B are SEM images illustrating surface morphology of an aluminum foil subjected to an one-week immersion test and a two-week immersion test, respectively, with an electrolyte-solution composition of a first demonstrative example of the present disclosure.
Figure 6B:
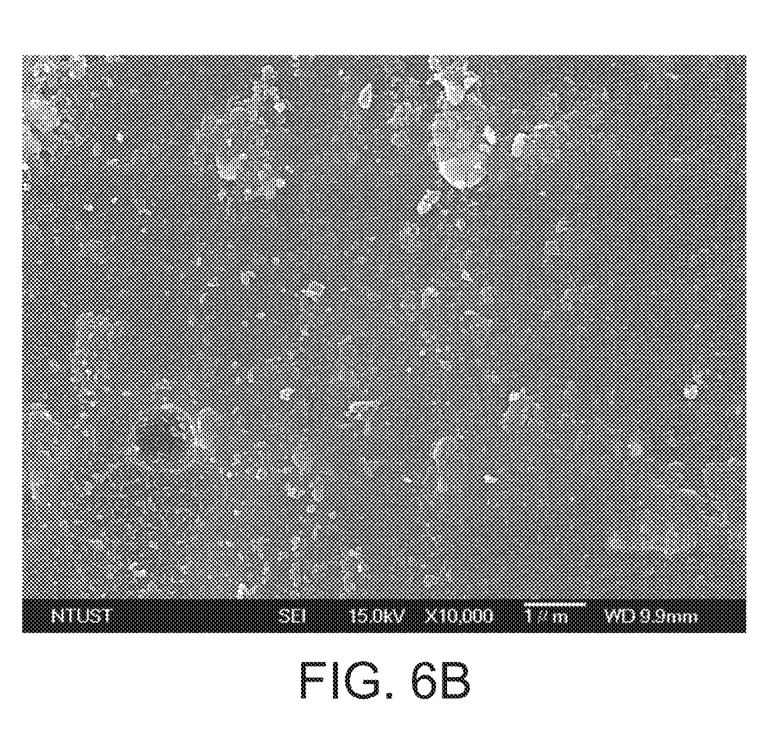

Refer to FIGS. 6A to 6B. FIGS. 6A to 6B are SEM images illustrating surface morphology of an aluminum foil subjected to an one-week immersion test and a two-week immersion test, respectively, with an electrolyte-solution composition of a first demonstrative example of the present disclosure. The electrolyte-solution composition includes a LiTFSI and a 8-hydroxyquinoline. The LiTFSI has a concentration of 1 mol/kgw, and the 8-hydroxyquinoline has a concentration of 0.1 mol/kgw. As shown in FIG. 6A, only a few small area of the aluminum foil surface is corroded after the one-week immersion test. As shown in FIG. 6B, the corroded areas on the aluminum foil surface are slightly expanded after the two-week immersion test.

Figure 7:
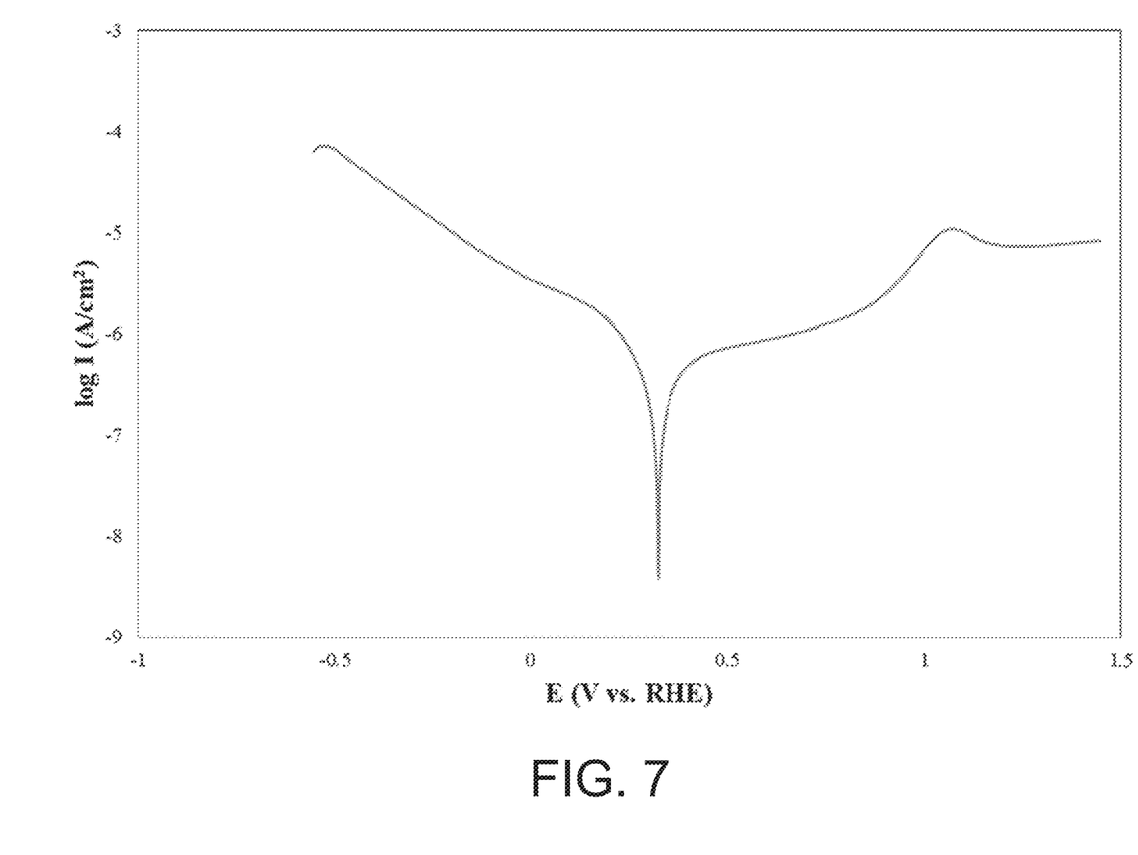
FIG. 7 is a potentiodynamic polarization curve of the electrolyte-solution composition of the first demonstrative example of the present disclosure.

Refer to FIG. 7. FIG. 7 is a potentiodynamic polarization curve of the electrolyte-solution composition of the first demonstrative example of the present disclosure. The electrolyte-solution composition includes a LiTFSI and a 8-hydroxyquinoline. The LiTFSI has a concentration of 1 mol/kgw, and the 8-hydroxyquinoline has a concentration of 0.1 mol/kgw. The potentiodynamic polarization curve is obtained with a three-electrode system. The three-electrode system includes an aluminum foil as a working electrode, a graphite as a counter electrode, and a reversible hydrogen electrode (RHE) as a reference electrode. In the test, the potential is firstly scanned in the cathodic direction from the corrosion potential ($E_{corr}$), and then scanned in the anodic direction from the corrosion potential. Before the test, the electrodes are immersed in the electrolyte-solution composition for a few seconds to ensure a consistent corrosion potential.

Fitting results of the potentiodynamic polarization curve in FIG. 7 are shown as follows. The corrosion potential is 335.66 mV. The corrosion current ($I_{corr}$) is 0.421 µA. The corrosion rate (CR) of the working electrode is 4.89×10$^{-3}$ millimeters per year (mmpy). The aluminum foil is further subjected to an Energy dispersive X-ray spectrometer (EDS) analysis after the potentiodynamic polarization test. Results of the EDS analysis show that the aluminum content on the surface of the aluminum foil is 84.85 wt %. In other words, after the potentiodynamic polarization test, about 85 wt % aluminum is remained on the surface of the aluminum foil.

Figure 8A:
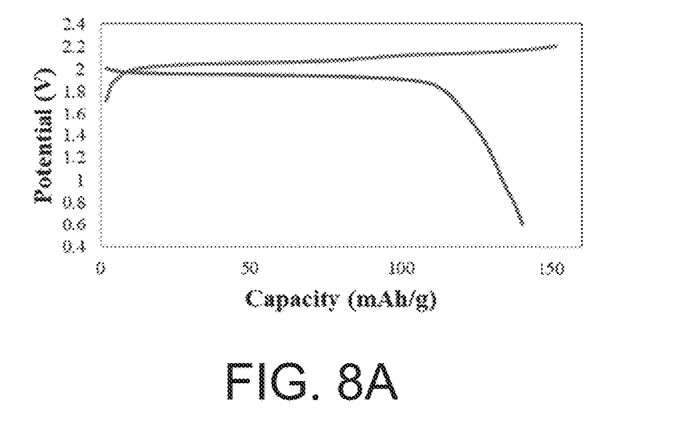
FIGS. 8A to 8C are charging/discharging curves of a secondary battery using the electrolyte-solution composition of the first demonstrative example of the present disclosure at different cycles.
Figure 8B:
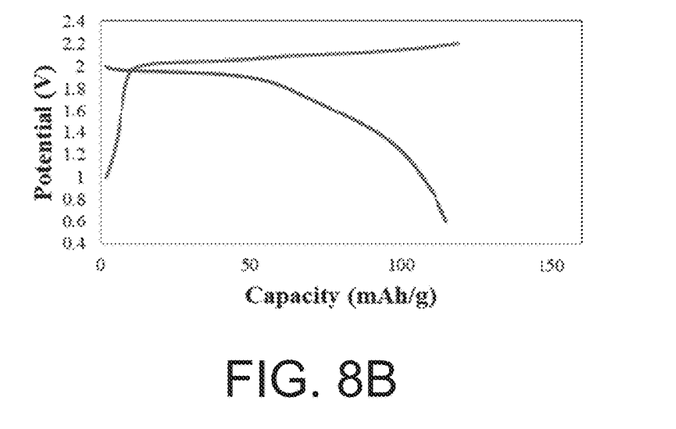
Figure 8C:
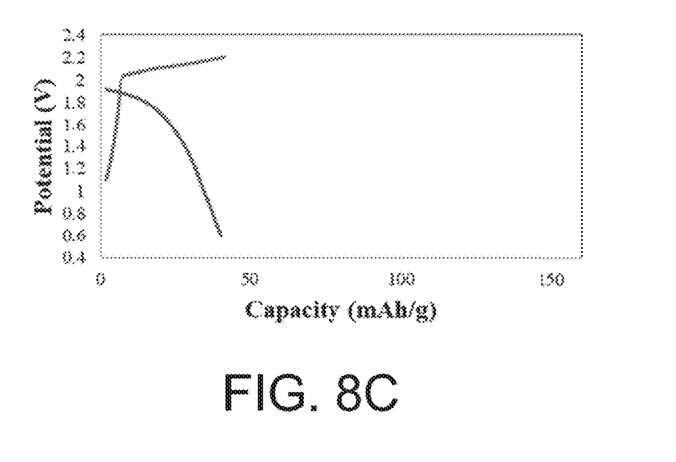

Refer to FIGS. 8A to 8C. FIGS. 8A to 8C are charging/discharging curves of a secondary battery using the electrolyte-solution composition of the first demonstrative example of the present disclosure at the first cycle, the fifth cycle and the fifteenth cycle. The electrolyte-solution composition includes a LiTFSI, a Zn(OTf)$_2$ and a 8-hydroxyquinoline. The LiTFSI has a concentration of 21 mol/kgw, the Zn(OTf)$_2$ has a concentration of 2 mol/kgw, and the 8-hydroxyquinoline has a concentration of 0.1 mol/kgw. Preferably but not exclusively, the secondary battery is a CR2032 type coin cell. The secondary battery includes an aluminum foil coated with LVPF as a cathode, a zinc foil as an anode, and a glass fiber as a separator. The charging/discharging experiment is carried out under the room temperature (25° C.) with a 40-channel battery analyzer. The charging/discharging rate (C-rate) is 2 C, and the potential window while charging/discharging is from 0.6 V to 2.2 V. Table 3 below shows the charging/discharging capacity of the secondary battery at the first cycle, the fifth cycle and the fifteenth cycle. As shown in table 3, the secondary battery using the electrolyte-solution composition of the first demonstrative example has a charging capacity of 151.75 mAh/g and a discharging capacity of 140.31 mAh/g, which are obviously greater than those of the secondary battery using the electrolyte-solution composition of the comparative example.

TABLE 3

|  | First cycle | Fifth cycle | Fifteenth cycle |
|---|---|---|---|
| Charging capacity (mAh/g) | 151.75 | 119.09 | 40.89 |
| Discharging capacity (mAh/g) | 140.31 | 115.33 | 39.94 |

Figure 9:
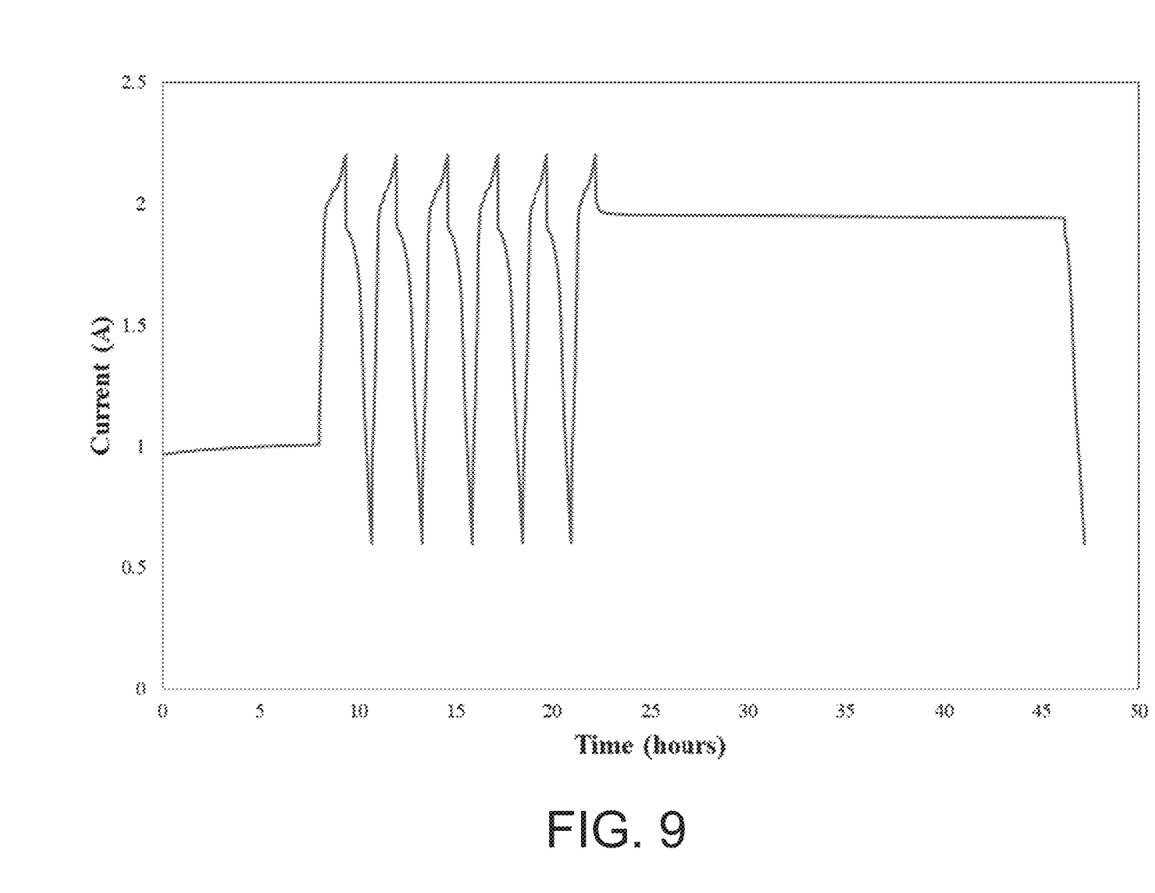
FIG. 9 is a battery characteristic curve illustrating another secondary battery using the electrolyte-solution composition of the first demonstrative example of the present disclosure.

Refer to FIG. 9. FIG. 9 is a battery characteristic curve illustrating another secondary battery using the electrolyte-solution composition of the first demonstrative example of the present disclosure. The secondary battery is charged and discharged for 5 cycles and left to sit for 24 hours. The electrolyte-solution composition includes a LiTFSI, a Zn(OTf)$_2$ and a 8-hydroxyquinoline. The LiTFSI has a concentration of 21 mol/kgw, the Zn(OTf)$_2$ has a concentration of 2 mol/kgw, and the 8-hydroxyquinoline has a concentration of 0.1 mol/kgw. Preferably but not exclusively, the secondary battery is a CR2032 type coin cell. The secondary battery includes an aluminum foil coated with LVPF as a cathode, a zinc foil as an anode, and a glass fiber as a separator. The charging/discharging experiment is carried out under the room temperature (25° C.) with a 40-channel battery analyzer. The charging/discharging rate (C-rate) is 0.2 C, and the potential window while charging/discharging is from 0.6 V to 2.2 V. As shown in FIG. 9, the secondary battery completes the fifth cycle at the twenty-second hour, and is left to sit for 24 hours to the forty-sixth hour. The current of the secondary battery is kept at the same level from the beginning to the end of the sitting period. It is clear that the secondary battery using the electrolyte-solution composition of the first demonstrative example has no self-discharge phenomenon.

Second Demonstrative Example

Figure 10A:
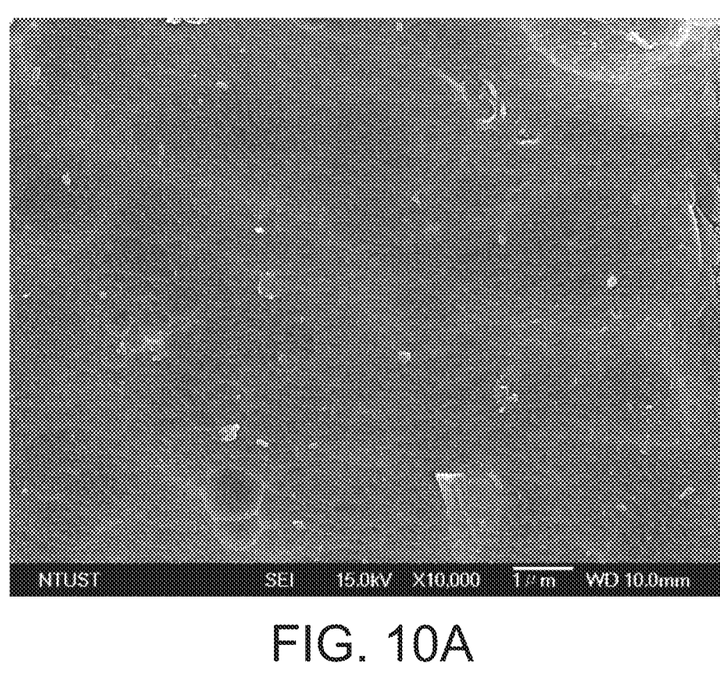
FIGS. 10A to 10B are SEM images illustrating surface morphology of an aluminum foil subjected to an one-week immersion test and a two-week immersion test, respectively, with an electrolyte-solution composition of a second demonstrative example of the present disclosure.
Figure 10B:
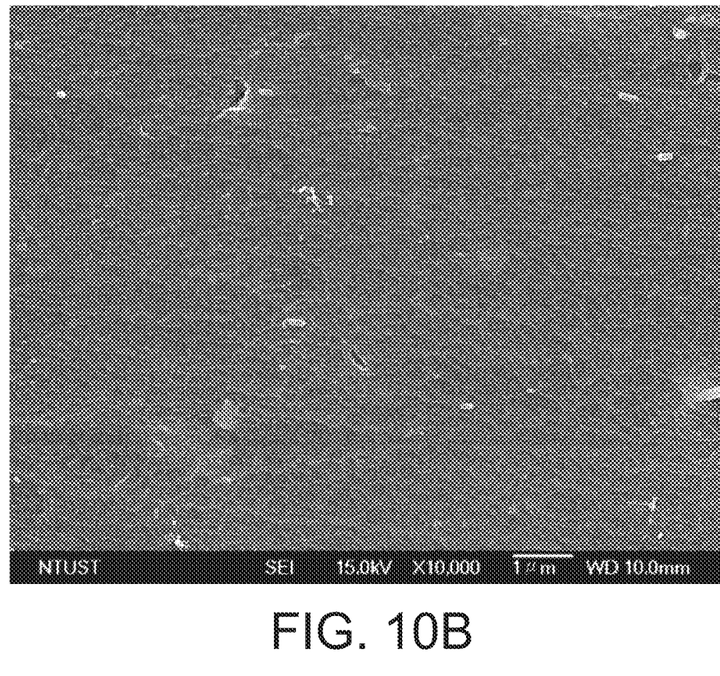

Refer to FIGS. 10A to 10B. FIGS. 10A to 10B are SEM images illustrating surface morphology of an aluminum foil subjected to an one-week immersion test and a two-week immersion test, respectively, with the electrolyte-solution composition of the second demonstrative example of the present disclosure. The electrolyte-solution composition includes a LiTFSI and a 5-formyl-8-hydroxyquinoline. The LiTFSI has a concentration of 1 mol/kgw, and the 5-formyl-8-hydroxyquinoline has a concentration of 0.1 mol/kgw. As shown in FIG. 10A, the surface of the aluminum foil is hardly corroded after the one-week immersion test. As shown in FIG. 10B, the surface of the aluminum foil is still hardly corroded after the two-week immersion test.

Figure 11:
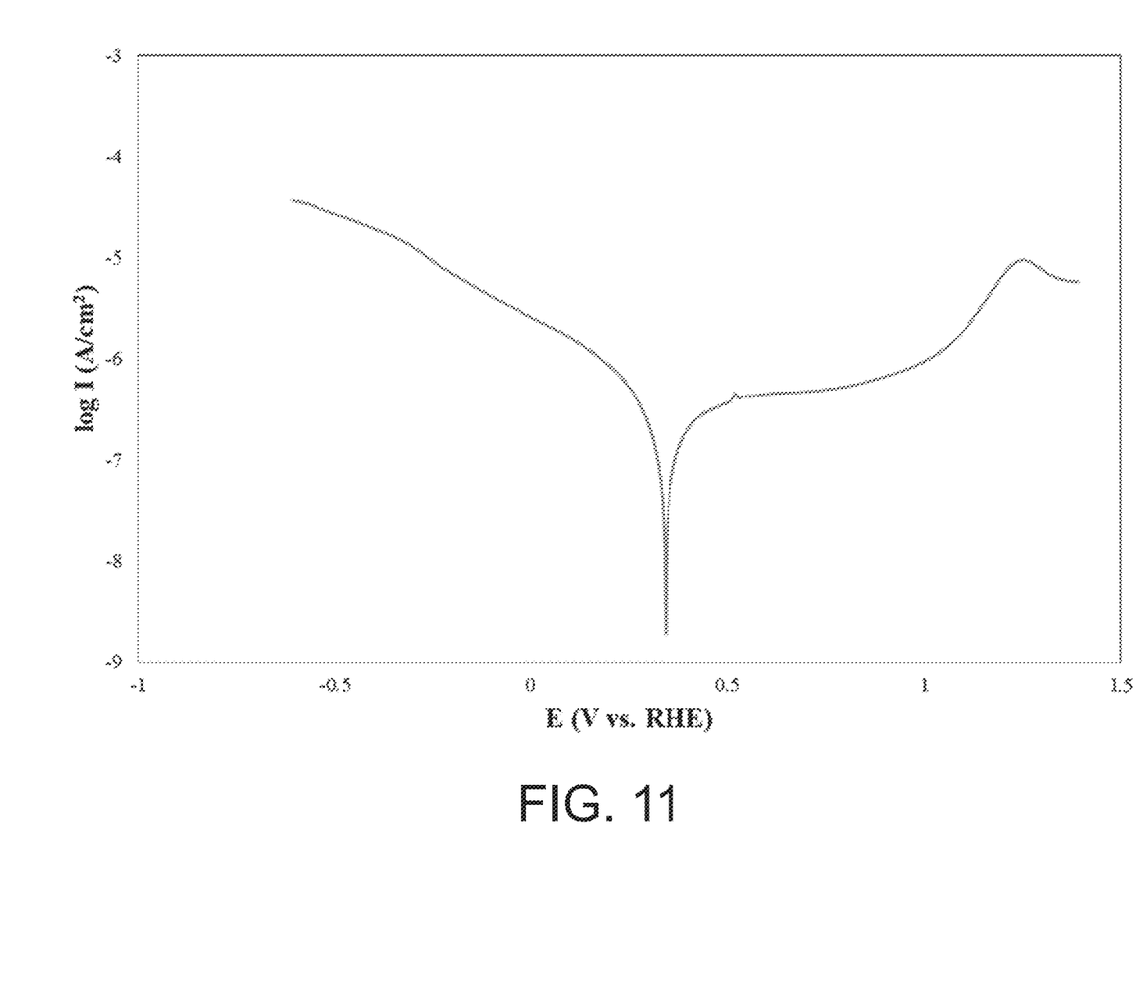
FIG. 11 is a potentiodynamic polarization curve of the electrolyte-solution composition of the second demonstrative example of the present disclosure.

Refer to FIG. 11. FIG. 11 is a potentiodynamic polarization curve of the electrolyte-solution composition of the second demonstrative example of the present disclosure. The electrolyte-solution composition includes a LiTFSI and a 5-formyl-8-hydroxyquinoline. The LiTFSI has a concentration of 1 mol/kgw, and the 5-formyl-8-hydroxyquinoline has a concentration of 0.1 mol/kgw. The potentiodynamic polarization curve is obtained with a three-electrode system. The three-electrode system includes an aluminum foil as a working electrode, a graphite as a counter electrode, and a reversible hydrogen electrode (RHE) as a reference electrode. In the test, the potential is firstly scanned in the cathodic direction from the corrosion potential ($E_{corr}$), and then scanned in the anodic direction from the corrosion potential. Before the test, the electrodes are immersed in the electrolyte-solution composition for a few seconds to ensure a consistent corrosion potential.

Fitting results of the potentiodynamic polarization curve in FIG. 11 are shown as follows. The corrosion potential is 306.85 mV. The corrosion current ($I_{corr}$) is 0.253 µA. The corrosion rate (CR) of the working electrode is 2.94×10$^{-3}$ millimeters per year (mmpy). The aluminum foil is further subjected to an Energy dispersive X-ray spectrometer (EDS) analysis after the potentiodynamic polarization test. Results of the EDS analysis show that the aluminum content on the surface of the aluminum foil is 86.30 wt %. In other words, after the potentiodynamic polarization test, about 86 wt % aluminum is remained on the surface of the aluminum foil.

Figure 12A:
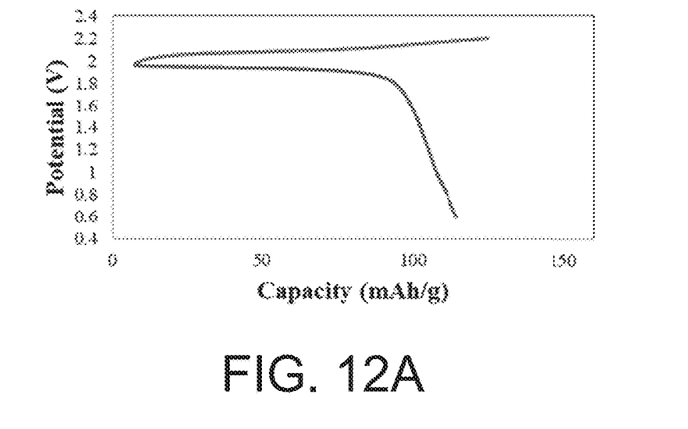
FIGS. 12A to 12C are charging/discharging curves of a secondary battery using the electrolyte-solution composition of the second demonstrative example of the present disclosure at different cycles.
Figure 12B:
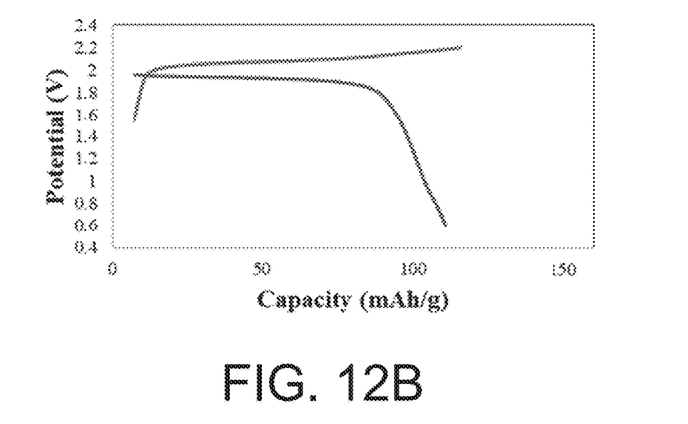
Figure 12C:
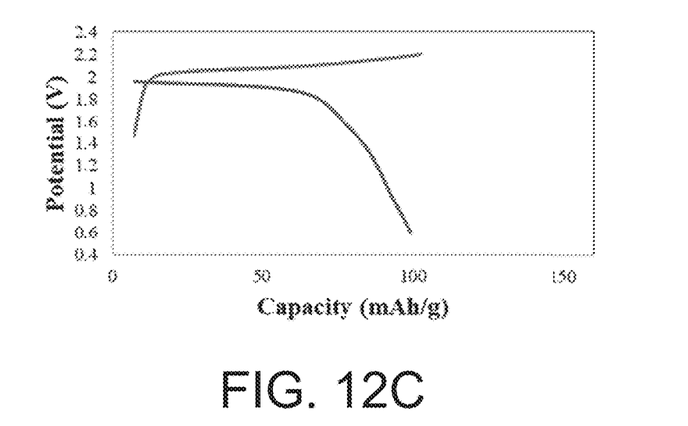

Refer to FIGS. 12A to 12C. FIGS. 12A to 12C are charging/discharging curves of a secondary battery using the electrolyte-solution composition of the second demonstrative example of the present disclosure at the first cycle, the fifth cycle and the fifteenth cycle. The electrolyte-solution composition includes a LiTFSI, a Zn(OTf)$_2$ and a 5-formyl-8-hydroxyquinoline. The LiTFSI has a concentration of 21 mol/kgw, the Zn(OTf)$_2$ has a concentration of 2 mol/kgw, and the 5-formyl-8-hydroxyquinoline has a concentration of 0.1 mol/kgw. The secondary battery is a CR2032 type coin cell. The secondary battery includes an aluminum foil coated with LVPF as a cathode, a zinc foil as an anode, and a glass fiber as a separator. The charging/discharging experiment is carried out under the room temperature (25° C.) with a 40-channel battery analyzer. The charging/discharging rate (C-rate) is 2 C, and the potential window while charging/discharging is from 0.6 V to 2.2 V. Table 4 below shows the charging/discharging capacity of the secondary battery at the first cycle, the fifth cycle and the fifteenth cycle. Table 4 also shows the capacity retention rate at the fifteenth cycle. As shown in table 4, the secondary battery using the electrolyte-solution composition of the second demonstrative example has a charging capacity of 125.04 mAh/g and a discharging capacity of 114.57 mAh/g, which are obviously greater than those of the secondary battery using the electrolyte-solution composition of the comparative example. Furthermore, the secondary battery using the electrolyte-solution composition of the second demonstrative example has a charging capacity retention rate of 81.9% and a discharging capacity retention rate of 86.6%, which are also obviously greater than those of the secondary battery using the electrolyte-solution composition of the comparative example.

TABLE 4

| | First cycle | Fifth cycle | Fifteenth cycle | Capacity retention rate at fifteenth cycle |
|---|---|---|---|---|
| Charging capacity (mAh/g) | 125.04 | 116.09 | 102.43 | 81.9% |
| Discharging capacity (mAh/g) | 114.57 | 110.67 | 99.18 | 86.6% |

Figure 13:
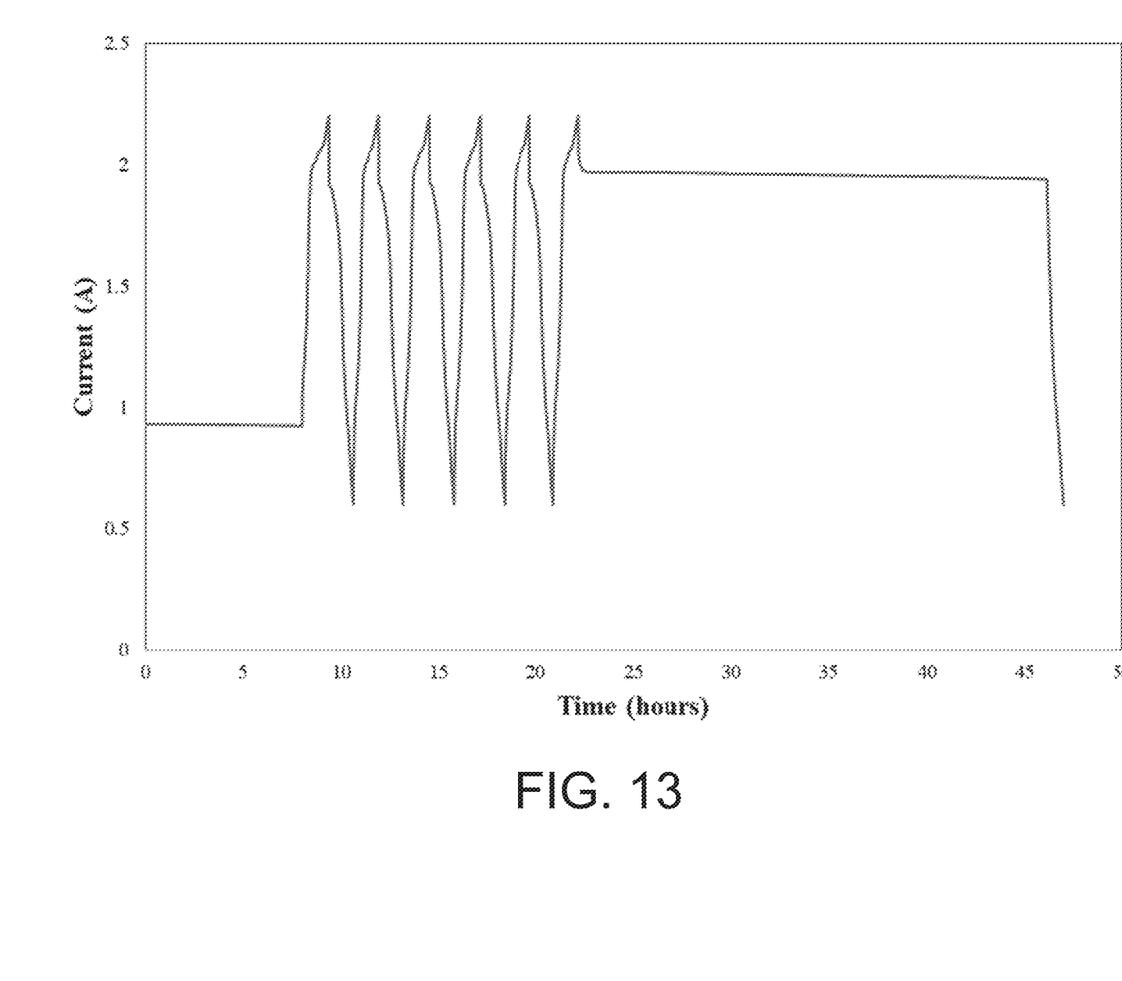
FIG. 13 is a battery characteristic curve illustrating another secondary battery using the electrolyte-solution composition of the second demonstrative example of the present disclosure.

Refer to FIG. 13. FIG. 13 is a battery characteristic curve illustrating another secondary battery using the electrolyte-solution composition of the second demonstrative example of the present disclosure. The secondary battery is charged and discharged for 5 cycles and left to sit for 24 hours. The electrolyte-solution composition includes a LiTFSI, a Zn(OTf)$_2$ and a 5-formyl-8-hydroxyquinoline. The LiTFSI has a concentration of 21 mol/kgw, the Zn(OTf)$_2$ has a concentration of 2 mol/kgw, and the 5-formyl-8-hydroxyquinoline has a concentration of 0.1 mol/kgw. The secondary battery is a CR2032 type coin cell. The secondary battery includes an aluminum foil coated with LVPF as a cathode, a zinc foil as an anode, and a glass fiber as a separator. The charging/discharging experiment is carried out under the room temperature (25° C.) with a 40-channel battery analyzer. The charging/discharging rate (C-rate) is 0.2C, and the potential window while charging/discharging is from 0.6 V to 2.2 V. As shown in FIG. 13, the secondary battery completes the fifth cycle at the twenty-second hour, and is left to sit for 24 hours to the forty-sixth hour. The current of the secondary battery is kept at the same level from the beginning to the end of the sitting period. It is clear that the secondary battery using the electrolyte-solution composition of the second demonstrative example has no self-discharge phenomenon.

As stated above, an electrolyte-solution composition having a hydroxyquinoline compound and a secondary battery using the same for improving an electrical performance thereof is provided. By using a hydroxyquinoline compound as an additive in an electrolyte-solution composition, an aluminum foil, which is used as a cathode of a secondary battery, is not easily oxidized and corroded by the electrolyte-solution composition in contact therewith. Accordingly, the capacity of the secondary battery is improved, and the occurrence of self-discharge phenomenon is avoided. The hydroxyquinoline compound further has a weight percent concentration ranged from 0.1 wt % to 2.5 wt % in the electrolyte-solution composition, so as to obtain an electrolyte-solution composition with appropriate viscosity. With the appropriate viscosity, the reduction of ionic conductivity of the electrolyte-solution composition is avoided, and the battery performance is further improved.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An electrolyte-solution composition configured in contact with an aluminous surface of a cathode, wherein the electrolyte-solution composition comprises:
   an electrolyte solution; and
   a hydroxyquinoline compound comprising a 5-formyl-8-hydroxyquinoline.

2. The electrolyte-solution composition according to claim 1, wherein the electrolyte solution comprises a lithium salt.

3. The electrolyte-solution composition according to claim 2, wherein the lithium salt comprises one selected from the group consisting of a lithium bis (trifluoromethanesulfonyl) imide (LiTFSI), a lithium bis (fluorosulfonyl) imide (LiFSI), a lithium hexafluorophosphate (LiPF$_6$), a lithium perchlorate (LiClO$_4$), a lithium metaborate (LiBO$_2$) and a combination thereof.

4. The electrolyte-solution composition according to claim 1, wherein the hydroxyquinoline compound has a weight percent concentration ranged from 0.1 wt % to 2.5 wt % in the electrolyte-solution composition.

5. The electrolyte-solution composition according to claim 1, wherein the hydroxyquinoline compound has a viscosity ranged from 1 mPa·s to 6 mPa·s.

6. The electrolyte-solution composition according to claim 1, wherein the cathode further includes a current collector, and the aluminous surface is a surface of the current collector.

7. A secondary battery, comprising:
   a cathode comprising an aluminous surface; and
   an electrolyte-solution composition configured in contact with the aluminous surface, wherein the electrolyte-solution composition comprises:
   an electrolyte solution; and
   a hydroxyquinoline compound comprising a 5-formyl-8-hydroxyquinoline.

8. The secondary battery according to claim 7, wherein the electrolyte solution comprises a lithium salt.

9. The secondary battery according to claim 8, wherein the lithium salt comprises one selected from the group consisting of a lithium bis (trifluoromethanesulfonyl) imide (LiTFSI), a lithium bis (fluorosulfonyl) imide (LiFSI), a lithium hexafluorophosphate (LiPF$_6$), a lithium perchlorate (LiClO$_4$), a lithium metaborate (LiBO$_2$) and a combination thereof.

10. The secondary battery according to claim 7, wherein the hydroxyquinoline compound has a weight percent concentration ranged from 0.1 wt % to 2.5 wt % in the electrolyte-solution composition.

11. The secondary battery according to claim 7, wherein the hydroxyquinoline compound has a viscosity ranged from 1 mPa·s to 6 mPa·s.

12. The secondary battery according to claim 7, wherein the cathode further includes a current collector, and the aluminous surface is a surface of the current collector.

* * * * *